United States Patent
Spinelli et al.

(10) Patent No.: US 12,446,834 B1
(45) Date of Patent: Oct. 21, 2025

(54) SYSTEM, DEVICE, AND METHOD FOR DYNAMIC JOB ROLE IDENTIFICATION

(71) Applicant: RS1Worklete LLC, Denver, CO (US)

(72) Inventors: Michael Patrick Spinelli, Croton, NY (US); Jenna Stephenson, Brooklyn, NY (US); SivaSankara Reddy Bommireddy, Secaucus, NJ (US)

(73) Assignee: RS1Worklete, LLC, Denver, CO (US)

( * ) Notice: Subject to any disclaimer, the term of this patent is extended or adjusted under 35 U.S.C. 154(b) by 529 days.

(21) Appl. No.: 18/057,113

(22) Filed: Nov. 18, 2022

Related U.S. Application Data (60) Provisional application No. 63/282,979, filed on Nov. 24, 2021.

(51) Int. Cl.
| | |
|---|---|
| *A61B 5/00* | (2006.01) |
| *A61B 5/11* | (2006.01) |
| *H04B 17/318* | (2015.01) |
| *H04W 4/02* | (2018.01) |
| *H04W 4/029* | (2018.01) |

(52) U.S. Cl.
CPC .......... *A61B 5/7275* (2013.01); *A61B 5/1118* (2013.01); *A61B 5/6802* (2013.01); *H04B 17/318* (2015.01); *H04W 4/023* (2013.01); *H04W 4/029* (2018.02)

(58) Field of Classification Search
CPC ....... H04W 4/00–029; H04W 4/30–48; H04W 8/00–245
See application file for complete search history.

(56) References Cited

U.S. PATENT DOCUMENTS

| | | | | |
|---|---|---|---|---|
| 2019/0236923 A1* | 8/2019 | Devdas | ................. | A61B 5/1113 |
| 2019/0340554 A1* | 11/2019 | Dotan-Cohen | .. | G06Q 10/06313 |
| 2021/0150870 A1* | 5/2021 | Gandrud | ................. | H04W 4/02 |
| 2021/0233654 A1* | 7/2021 | Arthur | ................... | G16H 40/63 |
| 2022/0027565 A1* | 1/2022 | Klasson | ................... | H04W 4/80 |
| 2023/0104068 A1* | 4/2023 | Boone | .................... | E21B 41/00 703/10 |

* cited by examiner

*Primary Examiner* — San Htun
(74) *Attorney, Agent, or Firm* — NOD Law PC (57) ABSTRACT

A method including receiving, by a processor, user-specific activity tracking data for a user and user-specific location data for the user, the user-specific activity tracking data being received from a wearable activity tracking device worn by the user and recorded while the user performs an activity role of a plurality of activity roles in a location; determining, by the processor, based on the user-specific location data, at least one candidate activity role of the plurality of activity roles; determining, by the processor, based on the user-specific activity tracking data and the user-specific location data, a most likely one of the at least one candidate activity role; selecting, by the processor the most likely one of the at least one candidate activity role as a current activity role; and providing, by the processor, to the wearable activity tracking device, an alerting parameter corresponding to the current activity role.

20 Claims, 8 Drawing Sheets

| Job Function | Average Safety Score | Average Max Forward Bend | Average Lift Rate | Average Max Tilt Velocity | Average Twist Velocity |
|---|---|---|---|---|---|
| Accessory Installer | 85.5 | 116 | 71.9 | 41.4 | 8.2 |
| Admin | 82.9 | 98.4 | 45.4 | 64.8 | 9 |
| Assembler | 79.3 | 64.1 | 63.2 | 54.7 | 9.8 |
| Body Shop | 82.9 | 87 | 41.7 | 53.3 | 12.5 |
| Building Maintenance | 79 | 108.6 | 27.2 | 62.6 | 12.6 |
| Maintenance | 78.9 | 123.5 | 20.7 | 56.3 | 11.8 |
| Management | 88.3 | 90.8 | 18.9 | 59.5 | 11.2 |
| Manager | 83.7 | 84.8 | 35.2 | 42.2 | 10 |
| Mechanic | 77.5 | 113.3 | 70 | 44.8 | 10.5 |
| Operations Manager | 77.7 | 64.6 | 22.9 | 42.5 | 8.3 |
| Painter | 84 | 73.1 | 59 | 43.8 | 9.6 |
| Part Coordinator | 87.7 | 111.8 | 50.1 | 51.4 | 14.7 |
| Parts Specialist | 86.6 | 74.3 | 54.5 | 62.9 | 13.2 |
| PDI | 79.2 | 66.1 | 38.1 | 61.4 | 14.4 |
| PDI Lead | 84.6 | 60.2 | 59.9 | 50.7 | 13.3 |
| Quality Inspector | 85.6 | 80.4 | 32.1 | 40.7 | 11.8 |
| Supervisor | 84.3 | 108.5 | 58.8 | 64.5 | 11.7 |
| Trainer | 89.3 | 72.7 | 31.6 | 49.2 | 8.8 |
| Warehouse Picker | 75.5 | 118.3 | 69 | 51.1 | 8.5 |
| Yard | 89.2 | 100.1 | 17.7 | 54.7 | 8.4 |

SYSTEM, DEVICE, AND METHOD FOR DYNAMIC JOB ROLE IDENTIFICATION

CROSS-REFERENCE TO RELATED APPLICATION

This application is a Section 111(a) application relating to and claiming the benefit of commonly-owned, U.S. Provisional Patent Application No. 63/282,979, filed on Nov. 24, 2021 and entitled "SYSTEM, DEVICE, AND METHOD FOR DYNAMIC JOB ROLE IDENTIFICATION," the contents of which are incorporated herein by reference in their entirety.

FIELD OF THE INVENTION

The present disclosure is related to wearable devices for providing haptic feedback to a wearer based on the wearer's lifting activity. More particularly, the present disclosure is related to wearable devices and related systems that dynamically determine a wearer's job role and adjusts parameters for providing haptic feedback based on the determined job role.

BACKGROUND OF THE INVENTION

Sagittal "forward" bending, such as while lifting objects, is a known risk factor that can result in injuries in the workplace. Thus, a technology that is capable of measuring and intervening during bending motions can help reduce the risk of injuries.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

SUMMARY OF THE DISCLOSURE

In some embodiments, a system includes a wearable physical activity tracking device and a computing device, wherein the wearable physical activity tracking device is configured (1) to be worn by a user, (2) to record a user-specific activity tracking data for the user and a user-specific location data while the user performs at least one activity role of a plurality of activity roles in at least one physical location of a plurality of physical locations, and (3) to provide tangible feedback to the user, when the providing tangible feedback is based at least on (a) the user-specific activity tracking data, and (b) at least one alerting parameter corresponding to a current activity role of the plurality of activity roles performed by the user, wherein the computing device includes a non-transient computer memory storing software instructions, and at least one processor, wherein, when the at least one processor executes the software instructions, the at least one processor is programmed to receive, for the user, at least: the user-specific activity tracking data and a user-specific location data for the user, to determine, based at least on the user-specific location data, at least one candidate activity role of the plurality of activity roles, to determine, based at least on the user-specific activity tracking data and the user-specific location data, a most likely one of the at least one candidate activity role, to select the most likely one of the at least one candidate activity role as the current activity role, and to provide, to the wearable physical activity tracking device, the at least one alerting parameter corresponding to the current activity role.

In some embodiments, the system also includes a plurality of location beacons, wherein the user-specific location data is determined based at least on proximity of the wearable physical activity tracking device to the plurality of location beacons. In some embodiments, the user-specific location data is determined by received signal strength indicator distance estimation. In some embodiments, the user-specific location data is determined by the computing device based at least on the proximity of the wearable physical activity tracking device to the plurality of location beacons. In some embodiments, the user-specific location data is received by the computing device from one of the location beacons. In some embodiments, the user-specific location data is determined by the wearable physical activity tracking device based on the based at least on the proximity of the wearable physical activity tracking device to the plurality of location beacons, and the user-specific location data is received by the computing device from the wearable physical activity tracking device.

In some embodiments, wherein the user-specific location data is determined by the wearable physical activity tracking device, and the user-specific location data is received by the computing device from the wearable physical activity tracking device.

In some embodiments, when the at least one processor executes the software instructions, the at least one processor is further programmed to determine a user-specific risk factor value for each of a plurality of risk factors based on the user-specific activity tracking data, wherein the step of determining the most likely one of the at least one candidate activity role is further based on the at least one user-specific risk factor value corresponding to at least one of the plurality of risk factors. In some embodiments, the at least one candidate activity includes at least two candidate activities, and the at least one of the plurality of risk factors is selected based on the at least two candidate activities. In some embodiments, the at least one of the plurality of risk factors is selected as the at least one of the plurality of risk factors that distinguishes the at least two candidate activities. In some embodiments, the step of determining the most likely one of the at least one candidate activity role is based at least on a weighted average of at least two user-specific risk factor values. In some embodiments, the step of determining the most likely one of the at least one candidate activity role is based at least on a weighted average of (1) the at least two user-specific risk factor values and (2) a correlation between the user-specific location data and at least one location, wherein each of the at least one location corresponds to a particular one of the at least one candidate activity. In some embodiments, the weighted average includes a first predetermined weight assigned to the at least two user-specific risk factor values and a second predetermined weight assigned to the correlation between the user-specific location data and the at least one location. In some embodiments, the step of determining the most likely one of the at least one candidate activity role includes receiving a first candidate activity risk factor value corresponding to (1) a first one of the at least one candidate activity role and (2) a first one of the plurality of risk factors, receiving a second candidate activity risk factor value corresponding to (1) a second one of the at least one candidate activity role and (2) the first one of the plurality of risk factors, and determining the most likely one of the at least one candidate activity role based at least on similarity of the user-specific risk factor value for the first one of the plurality of risk factors to (1) the first candidate activity risk factor value and (2) the second candidate activity risk factor value. In some embodiments, the plurality of risks factors includes at least two of a lift rate, a maximum sagittal bend angle, a maximum tilt velocity, an average twist velocity, an average sagittal bend angle, an average pitch angle, a length of bend time, an unsafe bend count, or a safety score.

In some embodiments, the step of determining, based at least on the user-specific location data, the at least one candidate activity role of the plurality of activity roles includes determining a location-based likelihood of each of the at least one candidate activity role. In some embodiments, the step of determining the most likely one of the at least one candidate activity role is further based on the location-based likelihood of each of the at least one candidate activity role.

In some embodiments, the step of determining, based at least on the user-specific location data, at least one candidate activity role of the plurality of activity roles is performed based on averaged user-specific location data over a moving time window.

In some embodiments, the at least one alerting parameter includes at least one of a threshold sagittal angle, a bend number, a feedback window, and a feedback gap.

In some embodiments, a computer-implemented method includes receiving, by a processor, at least user-specific activity tracking data for a user and user-specific location data for the user, wherein the user-specific activity tracking data is received from a wearable physical activity tracking device worn by the user and recorded while the user performs at least one activity role of a plurality of activity roles in at least one physical location of a plurality of physical locations; determining, by the processor, based at least on the user-specific location data, at least one candidate activity role of the plurality of activity roles; determining, by the processor, based at least on the user-specific activity tracking data and the user-specific location data, a most likely one of the at least one candidate activity role; selecting, by the processor the most likely one of the at least one candidate activity role as a current activity role; and providing, by the processor, to the wearable physical activity tracking device, at least one alerting parameter corresponding to the current activity role

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

The exemplary embodiments relate to wearable devices for monitoring physical activity by the wearer and location of the wearer of the wearable devices, dynamically identifying the wearer's work role based on the wearer's physical activity and location, and dynamically assigning parameters for providing tangible alerts to the wearer based on the identified work role. Some embodiments of the disclosure may be understood by referring, in part, to the following description and the accompanying drawings, in which like reference numbers refer to the same or like parts.

Figure 1:
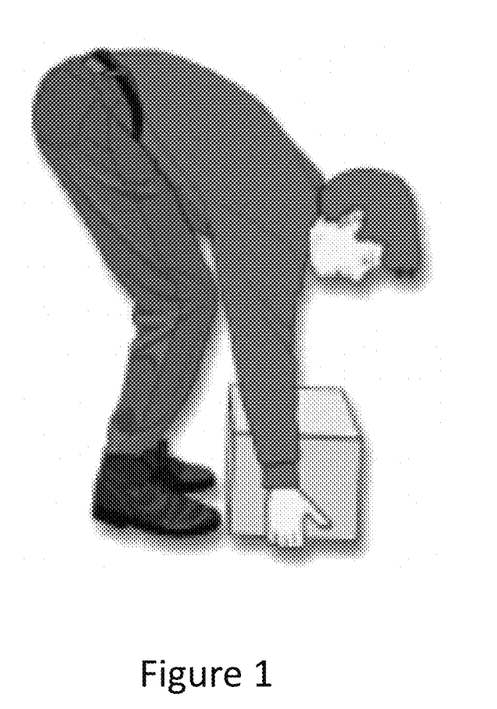
FIG. 1 shows an individual performing a high-risk lift, in which the back muscles are primarily used to lift an object.

Sagittal "forward" bending, such as while lifting objects, is a known risk factor that can result in injuries in the workplace. Lifting and bending activities can be identified based on an individual's "pitch" (i.e., the angle of the individual's torso with respect to the individual's longitudinal axis) exceeding a threshold value, which may be, for example, 30 degrees. FIG. 1 illustrates an individual lifting an object with improper lifting form, in which the individual lifts the object primarily using the individual's back muscles.

Figure 2:
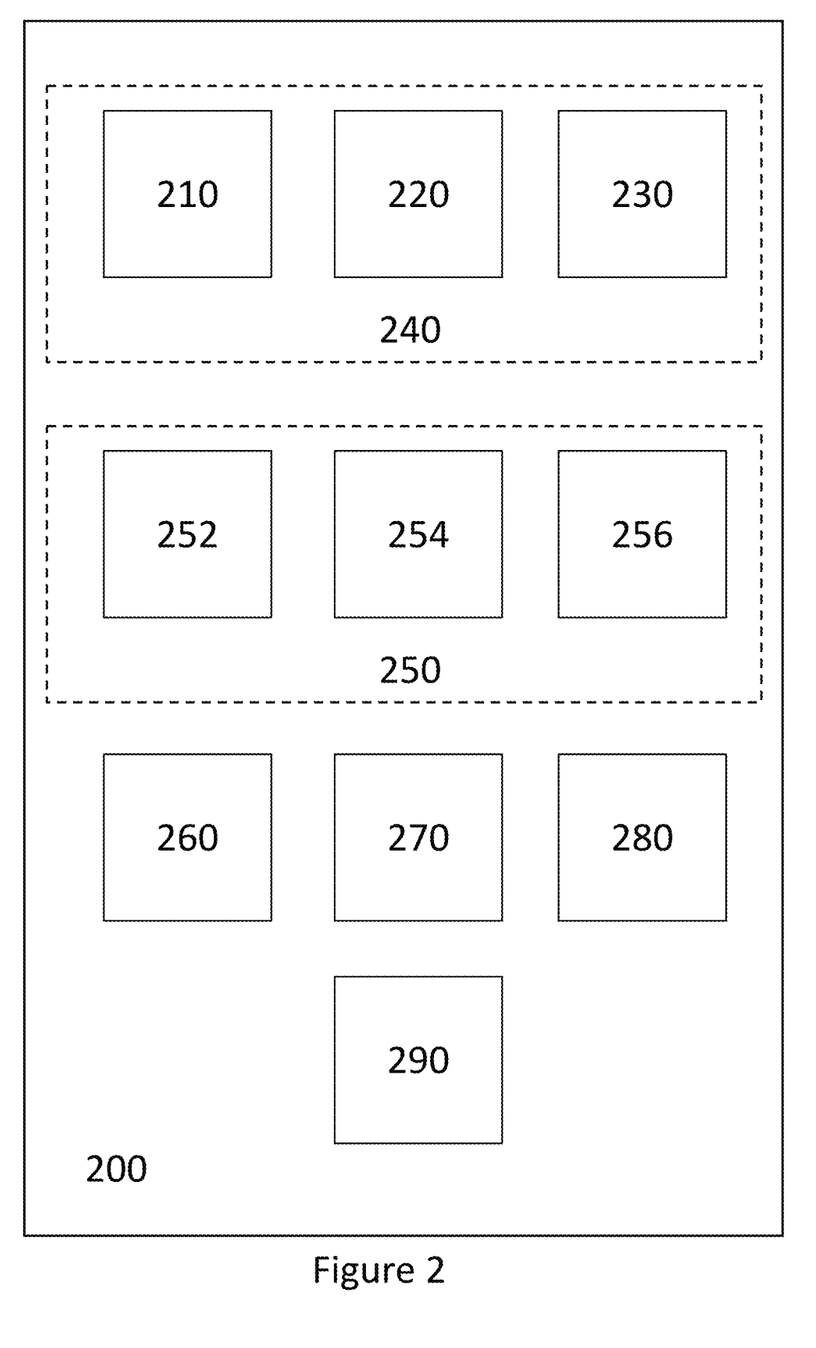
FIG. 2 shows a schematic illustration of an exemplary embodiment of a wearable physical activity tracking device.

In some embodiments, a wearable physical activity tracking device 200 is configured to be worn by a user and is operative to provide a user with feedback to encourage the user to perform good lifts. FIG. 2 schematically illustrates the wearable physical activity tracking device 200. In some embodiments, the wearable physical activity tracking device 200 is operative to provide the user with tangible feedback (e.g., haptic feedback, visible feedback, and/or auditory feedback) based on the performance of lifts by a wearer. In some embodiments, as will be described hereinafter, the wearable physical activity tracking device 200 is operative to provide the user with tangible feedback based in part on parameters that are based on a dynamically-identified job role performed by the wearer.

In some embodiments, the wearable physical activity tracking device 200 includes at least one sensor. In some embodiments, the wearable physical activity tracking device 200 includes an accelerometer 210 (e.g., a triaxial accelerometer). In some embodiments, the wearable physical activity tracking device 200 includes a gyroscope 220 (e.g., a triaxial gyroscope). In some embodiments, the wearable physical activity tracking device 200 includes a magnetometer 230 (e.g., a triaxial magnetometer). In some embodiments, the wearable physical activity tracking device 200 includes two or more of the accelerometer 210, the gyroscope 220, and the magnetometer 230 (e.g., includes the accelerometer 210 and the gyroscope 220, or includes the accelerometer 210 and the magnetometer 230, or includes the gyroscope 220 and the magnetometer 230, or includes the accelerometer 210 and the gyroscope 220 and the magnetometer 230). In some embodiments, the wearable physical activity tracking device 200 includes an inertial measurement unit ("IMU") 240 that includes the accelerometer 210, the gyroscope 220, and the magnetometer 230.

In some embodiments, the wearable physical activity tracking device 200 includes an onboard computing system 250. In some embodiments, the computing system 250 includes a microprocessor 252 and a non-transient computer memory 254 storing at least instructions executable by the microprocessor 252 to cause the microprocessor 252 to operate the wearable physical activity tracking device 200 as described herein. In some embodiments, the computing system 250 includes one or more communication interfaces 256 (e.g., a wireless communication link such as WiFi hardware and/or a wired communication link such as a USB port) enabling an external computing device to communicate with the computing system 250.

In some embodiments, the microprocessor 252 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the microprocessor 252 may include data-processing capacity provided by the microprocessor. In some embodiments, the microprocessor may include memory, processing, interface resources, controllers, and counters. In some embodiments, the microprocessor may also include one or more programs stored in memory.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

In some embodiments, the non-transient computer memory 254 may include, e.g., a suitable memory or storage solutions for maintaining electronic data representing the activity histories for each account. For example, the non-transient computer memory 254 may include database technology such as, e.g., a centralized or distributed database, cloud storage platform, decentralized system, server or server system, among other storage systems. In some embodiments, the non-transient computer memory 254 may, additionally or alternatively, include one or more data storage devices such as, e.g., a hard drive, solid-state drive, flash drive, or other suitable storage device. In some embodiments, the non-transient computer memory 254 may, additionally or alternatively, include one or more temporary storage devices such as, e.g., a random-access memory, cache, buffer, or other suitable memory device, or any other data storage solution and combinations thereof.

In some embodiments, the non-transient computer memory 254 may include, e.g., instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

In some embodiments, the wearable physical activity tracking device 200 includes a haptic feedback element 260. In some embodiments, the haptic feedback element 260 includes a haptic motor. In some embodiments, the wearable physical activity tracking device 200 includes a visible feedback element 270. In some embodiments, the visible feedback element 270 includes a display. In some embodiments, the visible feedback element includes one or more indicator lights (e.g., LEDs). In some embodiments, the wearable physical activity tracking device 200 includes an audible feedback element 280. In some embodiments, the audible feedback element 280 includes a speaker.

In some embodiments, the wearable physical activity tracking device 200 includes a location detection element 290. In some embodiments, the location detection element 290 is an element that allows the location (e.g., latitude and longitude) of the wearable physical activity tracking device 200 to be determined without two-way communication with external devices, such as a GPS receiver. In some embodiments, the location detection element 290 is an element that allows the location of the wearable physical activity tracking device 200 to be determined based on proximity to other computing devices, such as location beacons.

In some embodiments, the wearable physical activity tracking device 200 is a device that is specifically designed to monitor the physical activity of the wearer (e.g., the FUSE V5 device commercialized by StrongArm Technologies of Brooklyn, New York). In some embodiments, the wearable physical activity tracking device 200 is a general-purpose device such as a mobile phone or other mobile device.

Figure 3:
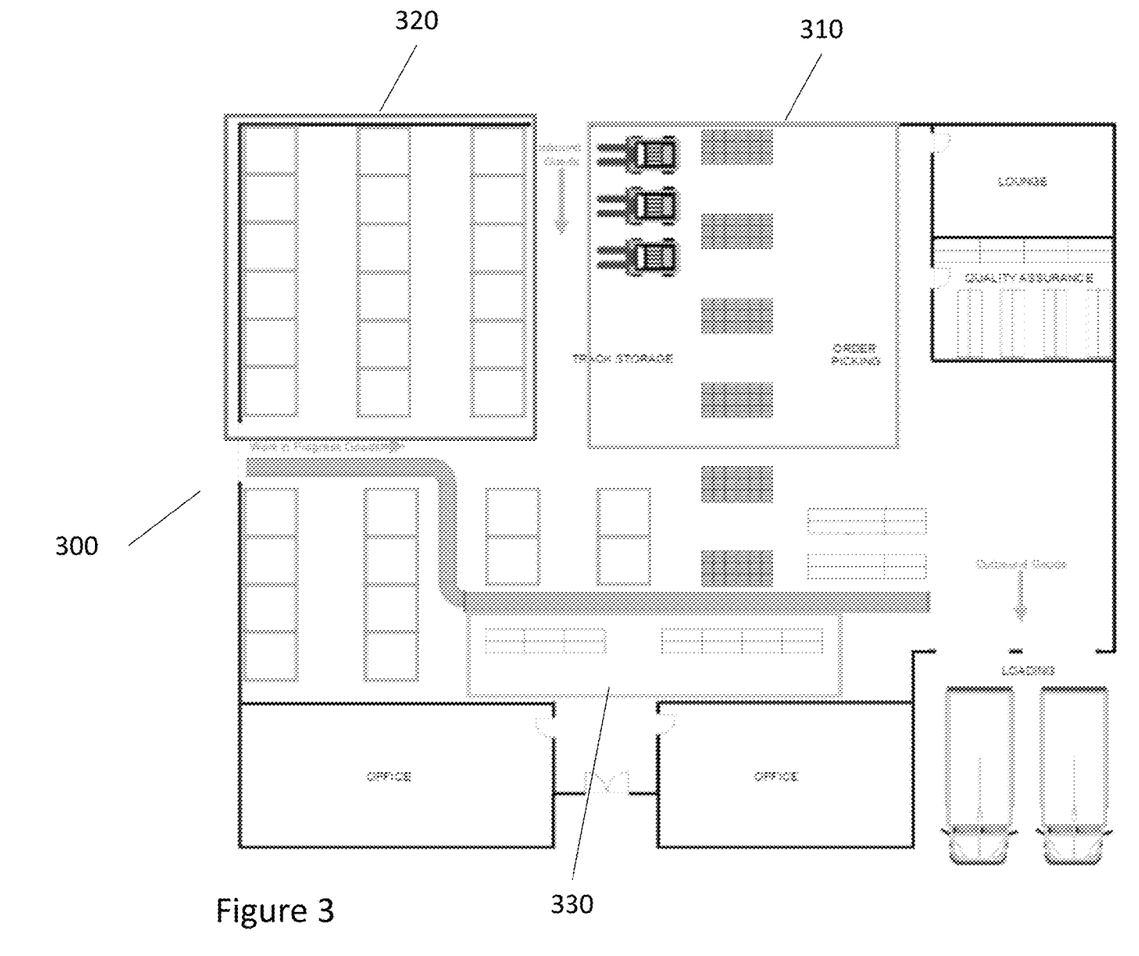
FIG. 3 shows a floor plan of an exemplary work site.

In some cases, the wearer of the wearable physical activity tracking device 200 is a worker who is working at a job site where more than one job role is performed by various workers. FIG. 3 shows a floor plan 300 of an exemplary warehouse in which multiple job roles are performed. In the floor plan 300, an area 310 is shown in which the typical job function is warehouse worker, an area 320 is shown in which the typical job function is warehouse picker, and an area 330 is shown in which the typical job function is painter. Examples of different job roles include, but are not limited to, warehouse picker, maintenance worker, warehouse worker, receiver, assembler, quality inspector, building maintenance worker, mechanic, accessory installer, pre-delivery inspection ("PDI") worker, shipping and receiving worker, parts specialist, management, PDI lead, driver, administrative assistant, operations manager, painter, supervisor, body shop worker, part coordinator, yard worker, manager, trainer, and accessory installation lead. In some cases, due to differences in the responsibilities of various different job roles, the appropriate parameters that may be applied in detecting lifts and providing haptic feedback may vary.

In some cases, during the course of a period of time (e.g., a work shift), the job role performed by a single worker may change (for example, an individual who normally performs a first job role may be tasked to perform a second job role for a period of time due to a lack of available tasks associated with the first job role or an excess of tasks associated with the second job role needing to be performed at a given time). In such situations, it may not be possible to manually update the worker's job role as applied by the wearable physical activity tracking device 200 in monitoring the wearer's motions to provide haptic feedback. The exemplary embodiments described herein relate to systems, methods, and devices that dynamically (e.g. in real time) determine the job role of a wearer of the wearable physical activity tracking device 200 and update the parameters applied to monitoring of motion of the wearer of the wearable physical activity tracking device 200 on the basis thereof.

Figure 4:
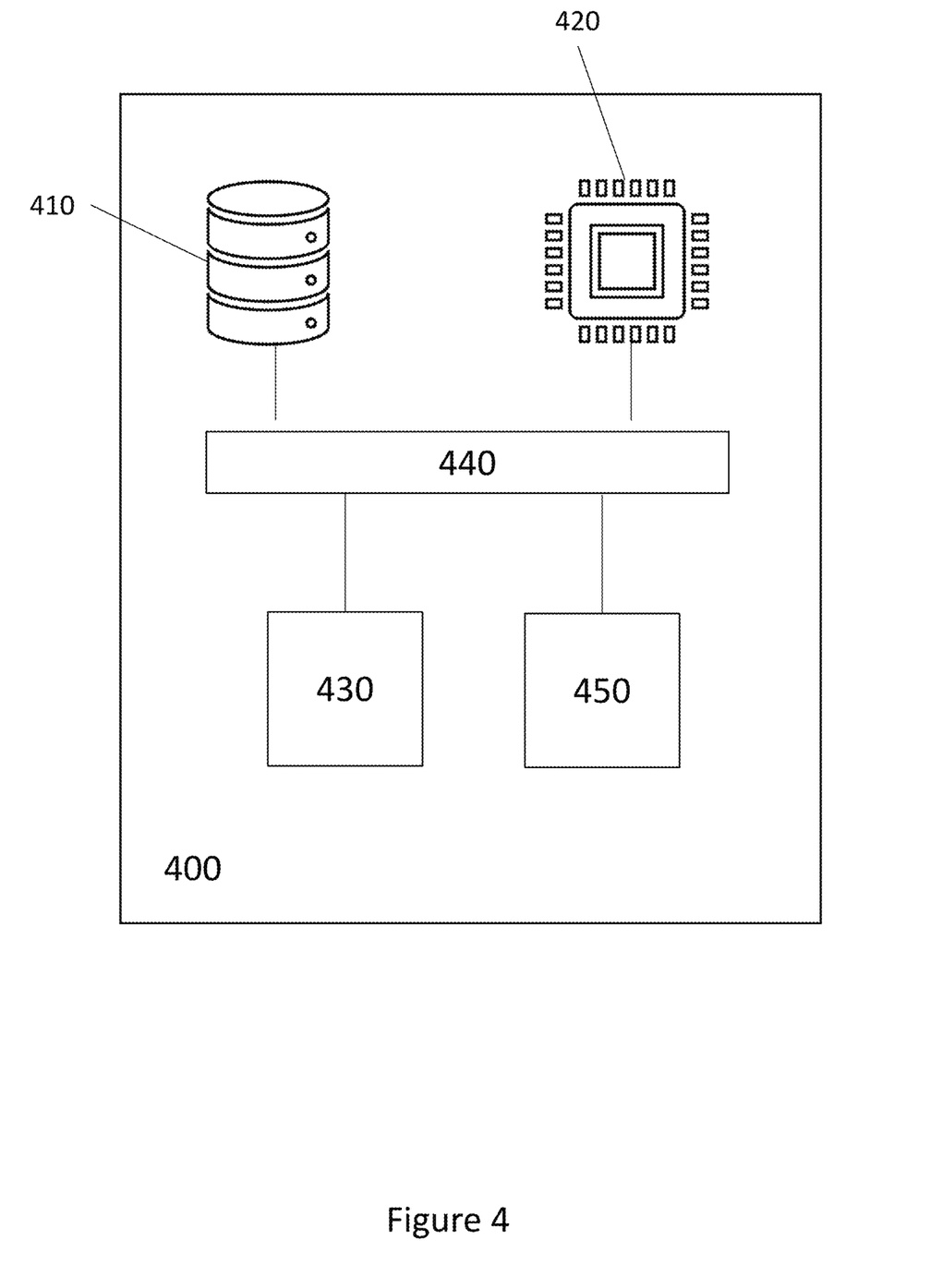
FIG. 4 shows a schematic illustration of an exemplary computing arrangement configured to dynamically determine the role of a wearer of a wearable physical activity tracking device.

In some embodiments, an exemplary method for dynamically determining a job role performed by a wearer of a wearable physical activity tracking device 200 is performed locally (e.g., client-side) at the wearable physical activity tracking device 200, e.g., using the onboard computing system 250 of the wearable physical activity tracking device 200. In some embodiments, an exemplary method for dynamically determining a job role performed by a wearer of the wearable physical activity tracking device 200 is performed remotely from the wearable physical activity tracking device 200, e.g., at a remote server, using cloud computing, etc. FIG. 4 illustrates an exemplary role classification system 400 that, in some embodiments, performs an exemplary method for dynamically determining a job role performed by a wearer of the wearable physical activity tracking device 200. In some embodiments, the role classification system 400 may include hardware components such as a processor 410, which may include local or remote processing components. In some embodiments, the processor 410 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processor 410 may include data-processing capacity provided by the microprocessor. In some embodiments, the microprocessor may include memory, processing, interface resources, controllers, and counters. In some embodiments, the microprocessor may also include one or more programs stored in memory.

In some embodiments, the role classification system 400 may include one or more computer devices implemented as a local or on-premises computing system, a cloud computing system or hybrid cloud computing system having one or more hardware and/or software components located in a cloud computing system and one or more hardware and/or software components located in a local computing system. In some embodiments, "cloud," "Internet cloud," "cloud computing," "cloud architecture," and similar terms may include at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). The aforementioned examples are, of course, illustrative and not restrictive.

Similarly, the role classification system 400 may include storage 420, such as one or more local and/or remote data storage solutions such as, e.g., local hard-drive, solid-state drive, flash drive, database or other local data storage solutions or any combination thereof, and/or remote data storage solutions such as a server, mainframe, database or cloud services, distributed database or other suitable data storage solutions or any combination thereof. In some embodiments, the storage 420 may include, e.g., a suitable non-transient computer readable medium such as, e.g., random access memory (RAM), read only memory (ROM), one or more buffers and/or caches, among other memory devices or any combination thereof.

In some embodiments, the role classification system 400 may implement a computer engine to dynamically classify a job role a wearer of the wearable physical activity tracking device 200 and update alerting parameters on the basis of the dynamically classified job role (e.g., as will be described hereinafter with reference to the method 600 shown in FIG. 6A). In some embodiments, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, the role classification system 400 may include computer engines including, e.g., a role classification engine 430. In some embodiments, the role classification engine 430 may include dedicated and/or shared software components, hardware components, or a combination thereof. For example, the role classification engine 430 may include a dedicated processor and storage. However, in some embodiments, the role classification engine 430 may share hardware resources, including the processor 410 and storage 420 of the role classification system 400 via, e.g., a bus 440. In some embodiments, the role classification system 400 may include other elements, including, but not limited to, a communication interface 450 (e.g., a wireless communication interface such as a WiFi interface) that is operative to allow the role classification system 400 to communicate with other computing devices, such as the wearable physical activity tracking device 200 described above, location beacons that will be described hereinafter, etc.

Figure 5:
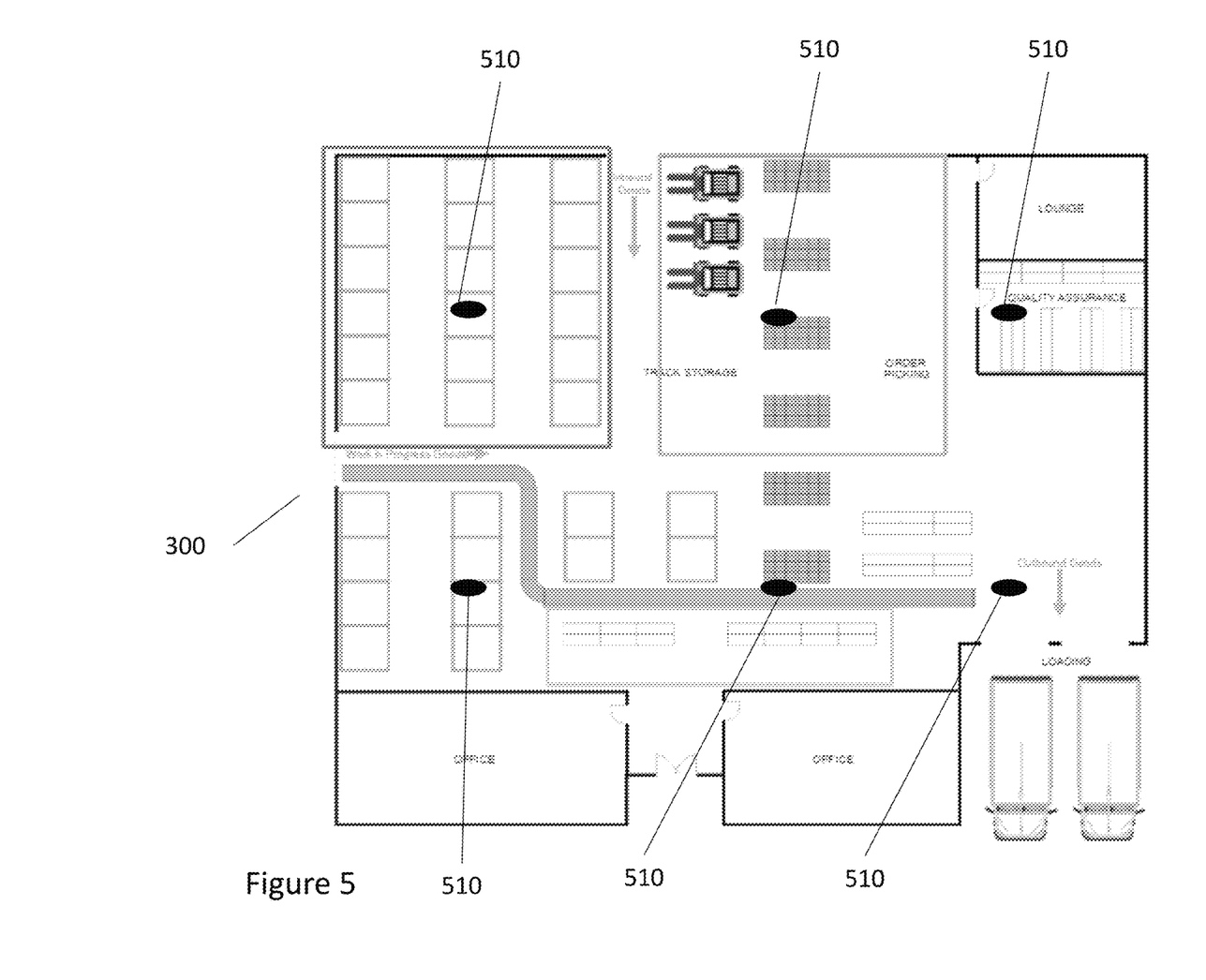
FIG. 5 shows a floor plan of an exemplary work site including location beacons.

The exemplary embodiments described herein relate to processes that involve determinations made based on at least a location of the wearer of the wearable physical activity tracking device 200. In some embodiments, the location of the wearer of the wearable physical activity tracking device 200 is determined using a plurality of location beacons located within an area of interest, such as a work site. In some embodiments, a location beacon is a computing device that is in contact with the wearable physical activity tracking device 200 (e.g., via wireless communication) in a manner such that the location of the wearable physical activity tracking device 200 can be estimated as a result of such contact. In some embodiments, location beacons serve purposes such as contact tracing and identifying the location of workplace accidents (e.g., slips, trips, or falls). In some embodiments, location beacons are implemented using existing wireless networking hardware. In some embodiments, the location of the wearer of the wearable physical activity tracking device 200 is determined based on the wearer's proximity to one or more such beacons. In some embodiments, the location is determined by received signal strength indicator ("RSSI") distance estimation. FIG. 5 shows a floor plan 500 of the work site previously discussed with reference to FIG. 3, and further including a plurality of location beacons 510. In some embodiments, the beacons 510 are distributed about an area of interest, such as a work site such as that shown in the floor plan 500, in order to enable the wearable physical activity tracking device 200 to be in contact with at least one of the beacons 510 while at any location within the work site. In some embodiments, the beacons 510 are distributed about an area of interest, such as a work site such as that shown in the floor plan 500, in order to enable the wearable physical activity tracking device 200 to be in contact with at least two of the beacons 510 while at any location within the work site. In some embodiments, the beacons 510 are distributed about an area of interest, such as a work site such as that shown in the floor plan 500, in order to enable the wearable physical activity tracking device 200 to be in contact with at least three of the beacons 510 while at any location within the work site.

Figure 6A:
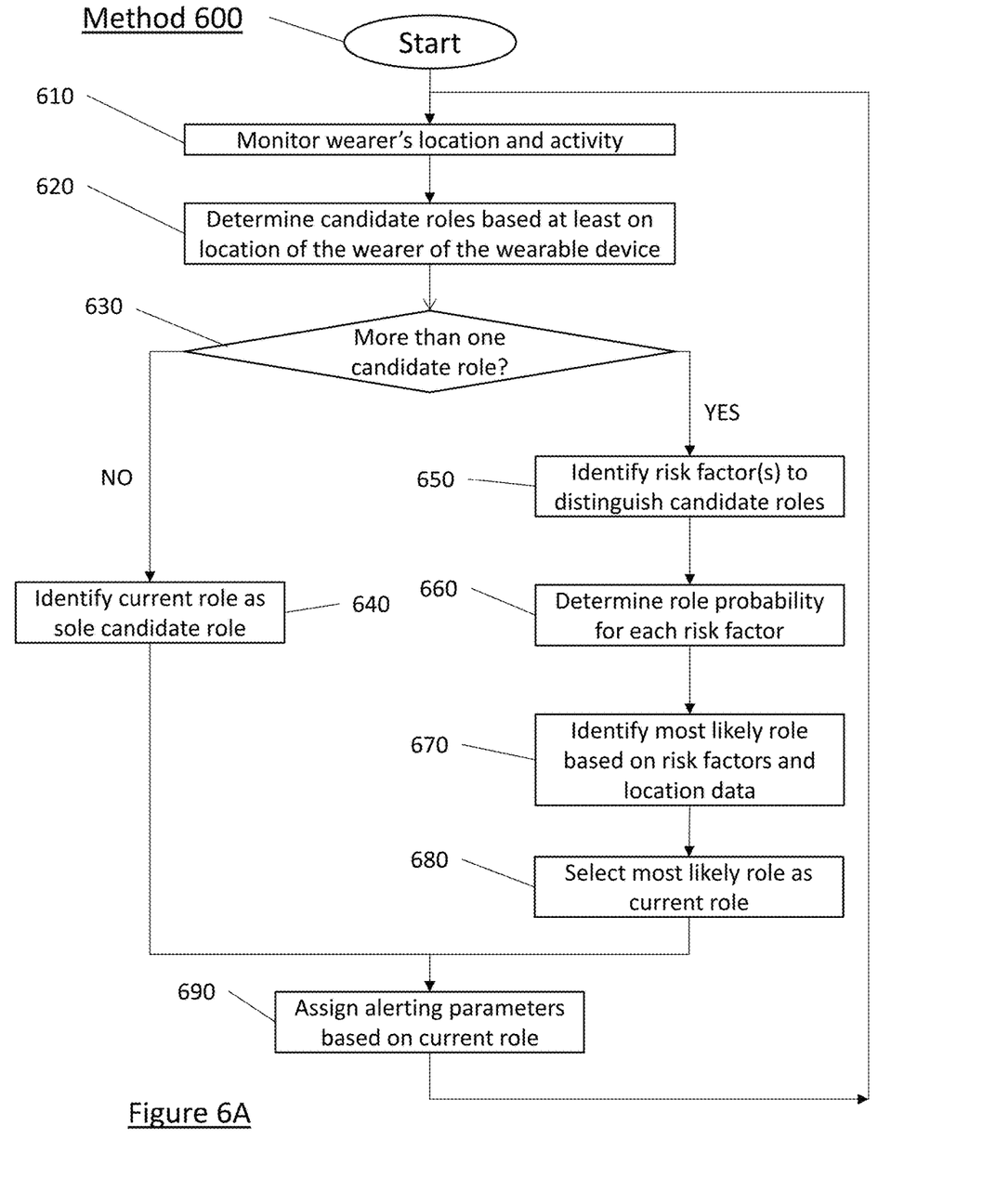
FIG. 6A shows a flowchart of an exemplary method.

FIG. 6A shows a flowchart of an exemplary method 600 for dynamically determining a job role performed by a wearer of a wearable physical activity tracking device 200 and for dynamically updating parameters for providing tangible alerts by the wearable physical activity tracking device 200 on the basis of the dynamically determined job role. As discussed above, in some embodiments, the method 600 is embodied by instructions stored in non-transitory instructions in the memory 254 of the wearable physical activity tracking device 200 and is performed by the microprocessor 252 of the wearable physical activity tracking device 200 executing such instructions. In some embodiments, the method 600 is embodied by (server side). In some embodiments, the method 600 is embodied by (mix of client and server side). In some embodiments, the method 600 is performed in parallel with a method for monitoring the motion of the wearer of the wearable physical activity tracking device 200 and providing tangible feedback (e.g., haptic feedback) based on the wearer's behavior, such as the performance of lifts by the wearer.

In step 610, motion and location of a wearer of the wearable physical activity tracking device 200 are continuously monitored while the wearable physical activity tracking device 200 is worn. In some embodiments, motion and location of the wearer is monitored by sensors within the wearable physical activity tracking device 200 (e.g., the accelerometer 210, the gyroscope 220, the magnetometer 230, and the location sensing element. In some embodiments, motion of the wearer is monitored by cameras in an environment in which the wearer is located. In some embodiments, location of the wearer is determined through the use of location beacons, as described above with reference to FIG. 5.

Figure 6B:
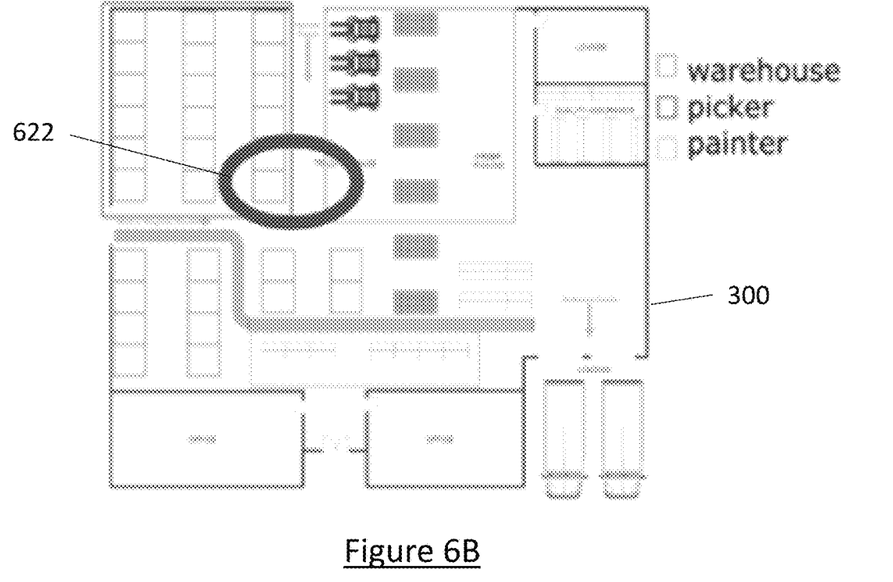
FIG. 6B shows a location of a worker in the exemplary floor plan shown in FIG. 3.

In step 620, a set of candidate job roles is determined for the wearer. In some embodiments, the set of candidate job roles is determined based on the location of the wearer as monitored in step 610. In some embodiments, the set of candidate job roles is determined by comparing the wearer's location to a floor plan of a work site (e.g., the floor plan 300 discussed above with reference to FIG. 3) and identifying the job roles that correlate with the wearer's location at a given time. In some embodiments, the wearer's candidate job roles are determined based on a current location. In some embodiments, the wearer's candidate job roles are determined based on the wearer's location over a time window. In some embodiments, the time window includes a predetermined amount of time preceding the current time. In some embodiments, the amount of time is between one second and fifteen minutes. In some embodiments, the amount of time is between one second and ten minutes. In some embodiments, the amount of time is between one second and five minutes. In some embodiments, the amount of time is one second, or is two seconds, or is five seconds, or is ten seconds, or is 15 seconds, or is 20 seconds, or is 30 seconds, or is 45 seconds, or is one minute, or is 90 seconds, or is two minutes, or is 150 seconds, or is three minutes, or is four minutes, or is five minutes, or is six minutes, or is seven minutes, or is eight minutes, or is nine minutes, or is ten minutes, or is 11 minutes, or is 12 minutes, or is 13 minutes, or is 14 minutes, or is 15 minutes. FIG. 6B shows a location 622 of a wearer of the exemplary device 200 within the floor plan 300 during a given time period.

In some embodiments, in step 620, in addition to determining a set of candidate roles based on the wearer's location, candidate roles are also determined (e.g., filtered) based on the roles that the individual wearer is able to perform. In some embodiments, an individual wearer may be able to perform a set of roles that is fewer than all of the roles that are performed at a given job site due to factors including, but not limited to, the worker's age, physical condition, disabilities, level of experience, roles for which the worker has been trained, and/or assigned role. In one illustrative and non-limiting example, a particular job site has locations corresponding to the job roles of warehouse picker, warehouse worker, painter, driver, assembler, and quality inspector. In this example, a particular worker is able to perform the roles of warehouse picker, warehouse worker, assembler, and quality inspector, and is not able to perform the roles of painter and driver. In this particular example, for a particular time period the particular worker's candidate roles based on location are determined to be warehouse worker, assembler, and painter. In this example, painter would be eliminated from the candidate roles identified based on location due to the wearer's inability to perform the role of painter, and the set of candidate roles determined by step 620 would therefore be warehouse worker and assembler.

In some embodiments, in step 620, in addition to determining a set of candidate roles based on the wearer's location, percentage probabilities are determined for each candidate roles based on the wearer's location. In some embodiments, the percentage probabilities are determined based on the locational overlap between the wearer's locations during a relevant time period and the job role locations within a given job site. For example, referring back to FIG. 6B, the location 622 includes an area that is 60% within area 310 and is 40% within area 320. In such an embodiment, a probability of 60% may be assigned to the job role corresponding to area 310 and a probability of 40% may be assigned to the job role corresponding to area 320. In some embodiments, the percentage probabilities are determined based on the amount of time during the relevant time period that was spent in the job role locations within a given job site. For example, continuing to refer to FIG. 6B, the location 622 includes area that is partially within area 310 and partially within area 320. In one non-limiting example, the relevant time period is the most recent ten minutes, during the most recent ten minutes the wearer of the device 200 has been within area 320 for six minutes and within area 310 for four minutes, and, as a result, a probability of 60% is assigned to the job role corresponding to area 320 and a probability of 40% is assigned to the job role corresponding to area 310.

In step 630, it is determined whether more than one candidate role has been identified in step 620. If more than one candidate role has been identified in step 620, then the method proceeds to step 650, which will be described hereinafter. If no candidate role or only one candidate role has been identified, the method proceeds to step 640, In step 640, if one candidate role has been identified in step 620, then the one identified candidate role is selected as the wearer's current role. Also in step 640, if no candidate role has been identified in step 620, then the wearer's "primary" role (for example, a default role, the wearer's assigned job role) is selected as the wearer's current role. In some embodiments, each individual worker who is a user of a wearable physical activity tracking device 200 is assigned such a primary role. In some embodiments, the primary role is assigned manually. In some embodiments, if the wearer's primary role is selected in step 640, then an alert is triggered to request verification as to whether the wearer is capable of performing the tasks currently being performed by the wearer. Following step 640, the method 600 proceeds to step 690, which will be described hereinafter.

In step 650, suitable risk factors are identified to distinguish between the candidate roles that were identified in step 620. In some embodiments, risk factors are quantitative indications of the physical activity of the wearer of the wearable physical activity tracking device 200 that may contribute to risk of injury by the wearer. An exemplary and non-limiting list of possible risk factors includes lift rate (e.g., the number of motions classified as lifts that are performed by the wearer over a given time period), maximum sagittal bend angle (e.g., the maximum "forward" bend as compared to a baseline upright orientation by the wearer over a given time period), maximum tilt velocity (e.g., the maximum rate of "forward" bending by the wearer over a given time period) average twist velocity (e.g., the average rate at which the wearer twists from side to side over a given time period), average sagittal bend angle (e.g., the average "forward" bend angle as compared to a baseline upright orientation by the wearer over a given time period), average pitch angle (e.g., incorporating sagittal bend as well as bending in other directions, such as lateral bending), length of bend time (e.g., the amount of time during a given time period that the wearer has spent at a "forward" bend angle greater than a given threshold, such as 30 degrees forward from upright), an unsafe bend count (e.g., the number of unsafe bends by the wearer during a given time period), and safety score (e.g., a score calculated for the wearer over a given time period as a composite of various other risk factors).

Figure 6C:
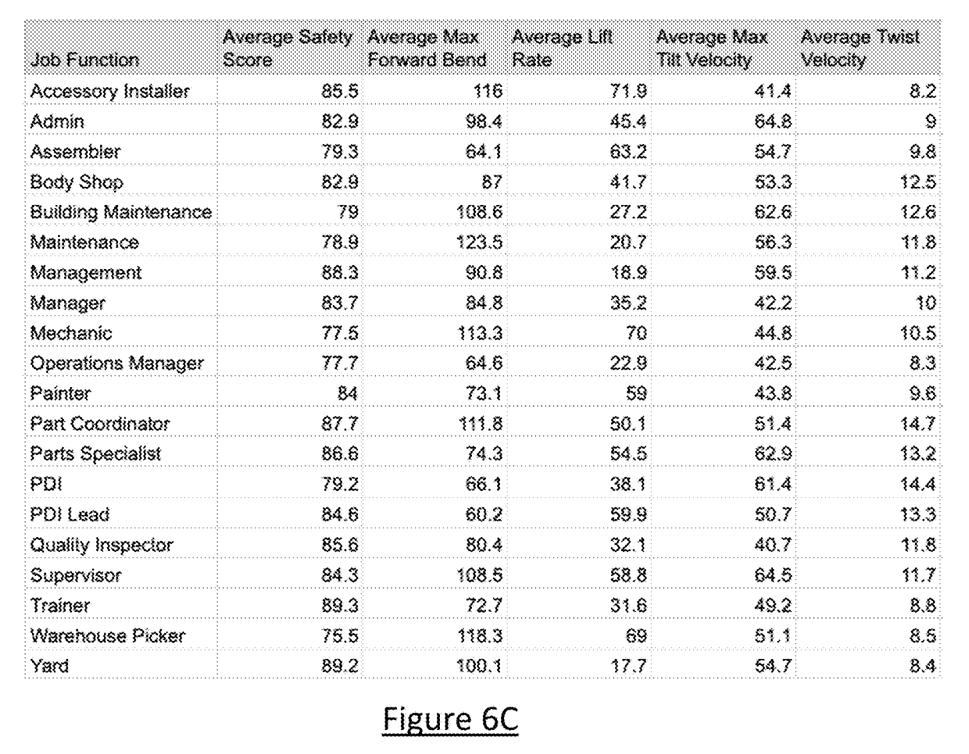
FIG. 6C shows exemplary risk factor values for a plurality of roles.

In some embodiments, a risk factor is a suitable risk factor to distinguish between two or more candidate roles if the average values of that risk factor among the two or more candidate roles differ from one another to a sufficient degree. In some embodiments, average risk factor values differ from one another to a sufficient degree if the difference between the average risk factor values is statistically significant. FIG. 6C shows a table of average values of five sample risk factors for twenty (20) possible job roles. In the table shown in FIG. 6C, average safety score is a value calculated based on the activity of a number of individuals having the relevant role over time; average maximum forward bend is expressed in degrees; average lift rate is expressed in lifts per hour; average maximum tilt velocity is expressed in degrees per second; and average twist velocity is expressed in degrees per second. It will be apparent to those of skill in the art that the specific list of job roles shown in FIG. 6C, the specific risk factors identified in FIG. 6C, and the specific average risk factor values shown in FIG. 6C are only exemplary, and that any of these items may vary in any given implementation of the exemplary embodiments described herein.

With reference the representative values shown in FIG. 6C, in one illustrative and non-limiting example, candidate roles have been identified as warehouse picker and mechanic (e.g., based on the wearer's location and allowed roles, as described above with reference to step 620), and a threshold of 10% difference in average values is applied to determine whether a given risk factor is suitable to distinguish between candidate roles. In this example, average maximum tilt velocity is suitable to distinguish between these two candidate roles, due to the difference of about 14.1% (i.e., the average maximum tilt velocity of 51.1 degrees per second for a warehouse picker is about 14.1% greater than the average maximum tilt velocity of 44.8 degrees per second for a mechanic). In this example, average twist velocity is also suitable to distinguish between these two candidate roles, due to the difference of about 23.5% (i.e., the average twist velocity of 10.5 degrees per second for a mechanic is about 23.5% greater than the average twist velocity of 8.5 degrees per second for a warehouse picker). In contrast, the differences of about 2.6% for average safety score (i.e., the average safety score of 77.5 for a mechanic is about 2.6% greater than the average safety score of 75.5 for a warehouse picker), about 4.4% for average maximum forward bend (i.e., the average maximum forward bend of 118.3 degrees for a warehouse picker is about 4.4% greater than the average maximum forward bend of 113.3 degrees for a mechanic), and about 1.4% for average lift rate (i.e., the average lift rate of 70 lifts per hour for a mechanic is about 1.4% greater than the average lift rate of 69 lifts per hour for a warehouse picker) do not meet the exemplary 10% threshold, and, as such, these three risk factors are not identified as suitable to distinguish between the two candidate roles. In some embodiments, if three or more candidate roles are under consideration, a given risk factor is identified as suitable for use if the risk factor meets the threshold difference for any two or more of the candidate roles.

Following identification of suitable risk factors in step 650, in step 660, role probabilities are determined for each selected risk factor. In some embodiments, if no suitable risk factors were identified in step 650, then step 660 is omitted and the method proceeds directly to step 670. In some embodiments, in step 660, role probabilities for a given risk factor are determined based on similarity of (a) the measured value of the given risk factor of the wearer of the wearable physical activity tracking device 200 for the time period under consideration to (b) the average values of the given risk factor for the candidate roles. In some embodiments, the measured value is compared to the average values based on similarity along a linear scale with endpoints defined by the minimum and maximum average values. As one illustrative example, if the average value of a given risk factor for a first candidate role is 10, the average value of the given risk factor for a second candidate role is 20, and the measured value of the risk factor for the wearer of the wearable physical activity tracking device during the relevant time period is 17, then the role probability for the second first candidate role is 30%. In this case, the length of the linear scale between the minimum and maximum average values is 20−10=10; the distance along the linear scale from the measured value to the candidate role in question is 17−10=7; the portion of the scale scanned by this distance is 7/10=70%; and the role probability of the role in question is 100%−70%=30%.

Figure 7:
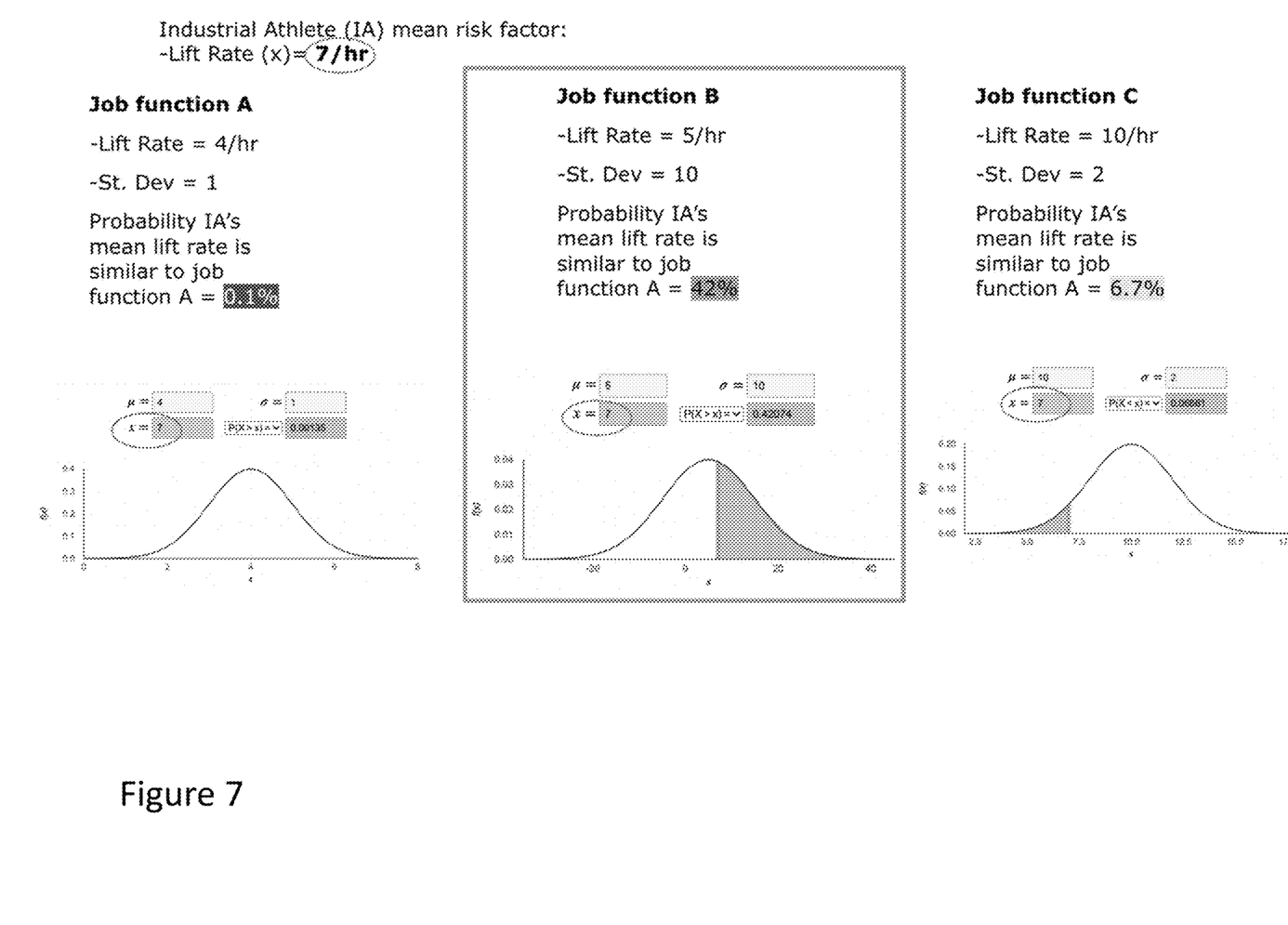
FIG. 7 shows an example of the application of statistical analysis to evaluate role probabilities.

In some embodiments, in cases where probability is to be calculated for more than two candidate roles, probability is calculated using statistical analysis. In some embodiments, statistical analysis is conducted based on data recorded for a group of workers during a training period. In some embodiments, following the training period, mean and standard deviation values are calculated for each job function and risk factor. In some embodiments, a wearer's most likely activity is then determined based on the means and the standard deviations for the wearer's candidate roles. FIG. 7 shows an example of such a statistical analysis.

Following step 660, in step 670, the most likely role is identified from among the candidate roles based on the wearer's location (e.g., as discussed above with reference to step 620) and the risk factors selected to distinguish the candidate roles (e.g., as discussed above with reference to steps 650 and 660). In some embodiments, if no suitable risk factors were identified in step 650, then the identification of step 670 as described hereinafter is performed solely on the basis of location. In some embodiments, the most likely role is identified based on a weighted average of the role probabilities of the candidate roles determined based on the wearer's location and based on the suitable risk factors. For example, as discussed above, each candidate role has been assigned a role probability (e.g., a likelihood of the candidate role) based on the wearer's location and based on the suitable risk factors, and weighted averages of these role probabilities are calculated to determine the most likely role.

In some embodiments, predetermined weights are assigned to location-based probability and to risk factor-based probability. For example, in some embodiments, a weight of 0.6 is predetermined for location-based probability and a weight of 0.4 is predetermined for risk factor-based probability; in some embodiments, a weight of 0.5 is predetermined for location-based probability and a weight of 0.5 is predetermined for risk factor-based probability; in some embodiments, a weight of 0.4 is predetermined for location-based probability and a weight of 0.6 is predetermined for risk factor-based probability. It will be apparent to those of skill in the art that these values are only exemplary and that any other predetermined weights may also be applied to location-based probability and to risk factor-based probability. Alternatively, in some embodiments, the weights for location-based probability and risk factor-based probability may not be predetermined, but, rather, may be dynamically determined. For example, in some embodiments, the weights for location-based probability and risk factor-based probability may be adjusted to more heavily weight the type of probability (e.g., to more heavily weight either location-based probability or risk factor-based probability) that more clearly distinguishes among the candidate roles. As another example, in some embodiments, the weights for location-based probability and risk factor-based probability may be adjusted to more heavily weight one type of probability or the other based on the quality of the source data (for example, if the quality of the location-based data is low-quality, then location-based probability may be weighted less heavily).

In some embodiments, the total weight applied to risk factor-based probability may be evenly distributed among the risk factors that were analyzed in steps 650 and 660. In some embodiments, the total weight applied to risk factor-based probability may be unevenly distributed among the risk factors that were analyzed in steps 650 and 660. For example, in some embodiments, a given risk factor may be weighted more heavily or less heavily based on how effectively it distinguishes among candidate roles. In some embodiments, the effectiveness of a given risk factor in distinguishing among candidate roles is based on the percentage differences between average risk factor values for different candidate roles as discussed above with reference to step 650).

In some embodiments, location-specific constraints are also considered. For example, in some embodiments, a given location is configured only to permit one job role for workers in the location, and as a result location is given all weight in such a location and activity-based risk factors are given no weight. For example, for a location that is a freezer, the only permitted job role in that location is that of a freezer worker. In such cases, any worker that enters such a location (e.g., a freezer) is assigned the corresponding job role (e.g., a freezer worker). In such cases, if the individual worker's approved job roles do not include the job role that corresponds to the location, then the wearer's primary role (e.g., as described above with reference to step 640) is assigned.

In some embodiments, the weighted average representing the probability that the wearer of a wearable physical activity tracking device has a job "X" based on a quantity n of suitable risk factors being considered can be calculated in accordance with the following:

$$Prob_X = Weight_L * LocProb_X + (Weight_{RF1} * RF1Prob_X + \ldots + Weight_{RFn} * RFnProb_X)$$

In the above expression, $Weight_L$ represents the weight given to location-based probability. $LocProb_X$ represents the role probability that the wearer's current job role is X based on the wearer's location (e.g., as discussed above with reference to step 620). $Weight_{RFn}$ represents the weight given to the nth risk factor under consideration, as discussed above. $RFnProb_X$ represents the role probability that the wearer's current job role is X based on evaluation of the nth risk factor (e.g., as discussed above with reference to step 660). Once role probabilities have been calculated for all candidate job roles, the most likely of the candidate job roles is identified as the candidate job role with the highest probability.

A sample calculation of job role probabilities may proceed as follows. In this sample, location-based probability is assigned a weight of 0.6 and risk factor-based probability is assigned a weight of 0.4. The wearer spends 60% of the relevant time window in the location corresponding to the job role "picker" and 40% of the relevant time window in the location corresponding to the job role "painter," and thus the location-based probability of the wearer's job role being "picker" is 0.6 and the location-based probability of the wearer's job role being "painter" is 0.4 The two risk factors identified as suitable to distinguish between the roles "picker" and "painter" are number of bends and average tilt speed. A weight of 0.3 is assigned to number of bends and a weight of 0.1 is assigned to average tilt speed, totaling to the weight of 0.4 assigned to risk factor-based probability. Based on consideration of the risk factor of number of bends, the probability that the current job role is "picker" is 90%, i.e., 0.9, and the probability that the current job role is "painter" is 10%, i.e., 0.1. Based on consideration of the risk factor of average tilt speed, the probability that the current job role is "picker" is 55%, i.e., 0.55, and the probability that the current job role is "painter" is 45%, i.e., 0.45. On the basis of the sample data presented above, the probability that the current job role is "picker" is calculated as:

$$Prob_{picker} = Weight_L * LocProb_{picker} + (Weight_{bends} * BendsProb_{Xpicker} + Weight_{tiltspd} * TiltspdProb_{picker})$$

$$Prob_{picker} = 0.6*0.6 + 0.3*0.9 + 0.1*0.55 = 0.685$$

$$Prob_{painter} = Weight * LocProb_{painter} + (Weight_{bends} * BendsProb_{painter} + Weight_{tildpsd} * TiltspdProb_{painter})$$

$$Prob_{painter} = 0.6*0.4 + 0.3*0.1 + 0.1*0.45 = 0.315$$

In other words, the probability that the wearer's current job role is "picker" is 0.685, i.e., 68.5%, and the probability that the wearer's current job role is "painter" is 0.315, i.e., 31.5%. On this basis, the most likely current job role is "picker".

In some embodiments, if no suitable risk factors were identified in step 670, and, in addition, the location is insufficient to distinguish between candidate roles, then the wearer's primary job role is identified as the most likely current job role. In some embodiments, the primary job role is as described with reference to step 640.

Following identification of the most likely current job role for the wearer of the wearable physical activity tracking device 200 in step 670, in step 680 the most likely current job role is assigned (e.g., selected or identified) as the wearer's current job role. In step 690, alerting parameters for the wearable physical activity tracking device 200 are set to the alerting parameters for the current job role assigned in step 680. As discussed above, alerting parameters are applied to the analysis of wearer motion data recorded by the wearable physical activity tracking device 200 in identifying whether the wearer has engaged in a physical activity (e.g., an unsafe lift) for which tangible feedback (e.g., haptic feedback) should be provided to the wearer via the wearable physical activity tracking device 200.

In some embodiments, the alerting parameters include sagittal angle threshold. In some embodiments, sagittal angle threshold refers to a threshold sagittal angle (e.g., angle of "forward" bending as compared to an upright orientation) that causes a bend to be identified when the wearer's sagittal angle exceeds the threshold sagittal angle. In some embodiments, the alerting parameters include a bend number. In some embodiments, a bend number refers to a number of bends that need to occur before tangible feedback (e.g., haptic feedback) is provided to the wearer. For example, if the bend number is 3, tangible feedback is provided once the wearer has performed three bends (e.g., as identified based on the sagittal angle threshold parameter described above). In some embodiments, the alerting parameters include a feedback window. In some embodiments, a feedback window refers to an amount of time before the count of bends considered for application of the bend number resets. For example, if the bend number is 3 and the feedback window is 10 minutes, then if the wearer performs two bends and 10 minutes elapse before the wearer's next bend, then the number of bends resets after 10 minutes and begins to be counted anew, rather than triggering an alert after the wearer's next bend. In some embodiments, the alerting parameters include a feedback gap. In some embodiments, a feedback gap refers to an amount of time that must take place in between alerts, regardless of the number of bends that take place in the intervening time period. For example, if the feedback gap is 30 seconds, then at least 30 seconds must pass between a first alert and a subsequent second alert, regardless of the wearer's behavior after the first alert. Thus, for one particular job role, an example parameter set may include a sagittal angle threshold of 35 degrees, a bend number of 4, a feedback window of 10 minutes, and a feedback gap of 90 seconds.

In some embodiments, parameter sets are assigned in a manner so as to provide a predetermined number of alerts to each worker. In some embodiments, the predetermined number is selected so as to provide each working with a quantity of alerts (e.g., a number of alerts per hour) that is sufficiently large to encourage behavior change while being sufficiently small to avoid annoyance to the wearer. In some embodiments, the predetermined number is four to six alerts per hour. In some embodiments, parameter sets are determined by analyzing a set of data for a given job function (e.g., 50 shifts of workers performing the job function) and considering different combinations of parameters until a suitable combination is identified.

In some embodiments, monitoring motion of the wearer of the wearable physical activity tracking device 200 includes detecting lifts performed by the wearer. In some embodiments, a lift occurs when the wearer's body pitch, which indicates the forward bend of the wearer's torso as compared to the wearer's longitudinal axis, exceeds a threshold pitch. In some embodiments, the threshold pitch is 30 degrees. In some embodiments, the threshold pitch is between 25 and 35 degrees. In some embodiments, the threshold pitch is between 20 degrees and 40 degrees.

In some embodiments, the pitch is monitored through analysis of sensors in the wearable physical activity tracking device 200 that include the accelerometer 210 and the gyroscope 220. In some embodiments, orientation of the wearable physical activity tracking device 200 is determined based on data recorded by the accelerometer 210 and the gyroscope 220. In some embodiments, the orientation of the wearable physical activity tracking device 200 is translated to determine the orientation of the wearer. In some embodiments, the orientation of the wearer includes at least a pitch of the wearer. In some embodiments, the pitch of the wearer is compared to the threshold pitch as described above, and a lift is identified when the pitch of the wearer exceeds the threshold pitch (for example, in embodiments where the threshold pitch is 30 degrees, a lift is identified where the wearer's pitch is more than 30 degrees forward from vertical).

In some embodiments, the orientation of the wearable physical activity tracking device 200 at any given moment in time can be described by considering an absolute reference frame of three orthogonal axes X, Y, and Z, defined by the Z-axis being parallel and opposite to the Earth's gravity's downward direction, the X-axis pointing towards the Earth's magnetic north, and the Y-axis pointing in a 90-degree counterclockwise rotation from the Z-axis. In some embodiments, the orientation of the wearable physical activity tracking device 200 in space is described as a rotation from the zero-points of this absolute reference frame. In some embodiments, a Tait-Bryan chained rotation (i.e., a subset of Davenport chained rotations) is used to describe the rotation of the wearable physical activity tracking device 200 from the zero points of the absolute reference frame to the orientation of the wearable physical activity tracking device 200 in space. In some embodiments, the rotation is a geometric transformation which takes the yaw, pitch, and roll angles as inputs and outputs a vector that describes the orientation of the wearable physical activity tracking device 200.

In some embodiments, the yaw, pitch, and roll angles that describe the spatial orientation of the wearable physical activity tracking device 200 are used to calculate the yaw, pitch, and roll angles that describe the spatial orientation of the body of the individual who is wearing the wearable physical activity tracking device 200. In some embodiments, to perform this calculation, it is assumed that the wearable physical activity tracking device 200 is rigidly fixed to the initially upright body of the wearer, and the Tait-Bryan chained rotation of the wearable physical activity tracking device 200 is applied in reverse order, to the body, instead of to the device 200. In some embodiments, the result of this rotation is a vector which can be considered to be the zero point of the body, to which the yaw, pitch, and roll angles of the wearable physical activity tracking device 200 can be applied via a further Tait-Bryan chained rotation to calculate a vector that describes the orientation of the body in space at all times (i.e., a set of YPR values for the body). In some embodiments, a geometric calculation is performed on the set of YPR values for the body to determine the sagittal, twist, and lateral positions. In some embodiments, the sag-ittal, twist, and lateral positions are determined according to the following equations, with YPR values in degrees: Sagittal=(−1*cos(Roll))*(90−Pitch) Lateral=(−1*sin (Roll))* (90−Pitch).

In some embodiments, the pitch is monitored through analysis of sensors in the wearable physical activity tracking device 200 that include only the accelerometer 210. In some embodiments, wherein the y-axis acceleration $a_y$ represents acceleration along the person's longitudinal axis and the x-axis acceleration $a_x$ represents acceleration along the person's sagittal axis, the pitch angle Θ can be calculated as $$\theta = \tan^{-1}\left(\frac{a_x}{a_y}\right).$$

In some embodiments, the calculated pitch angle is then compared to a threshold pitch (e.g., a sagittal angle threshold that is assigned to the wearer of the wearable physical activity tracking device 200 on a role-specific basis based on output of the method 600) to identify a lift. For example, in embodiments where the threshold pitch is 30 degrees, a lift is identified where the wearer's pitch is more than 30 degrees forward from vertical.

Following step 690, the method 600 returns to step 610 and the location and physical activity of the wearer of the wearable physical activity tracking device 200 continue to be monitored on an ongoing basis. In some embodiments, the wearer's current job role is determined (e.g., by performance of steps 620 through 690) continuously or in real-time (e.g., at a frequency of at least once per minute, such as one time per minute, or two times per minute, or three times per minute, or four times per minute, or five times per minute, or six times per minute, or ten times per minute, or 12 times per minute, or 15 times per minute, or 30 times per minute, or one time per second, or ten times per second, or 100 times per second). In some embodiments, the wearer's current job role is determined periodically, such as once every five minutes, or once every ten minutes, or once every fifteen minutes. In some embodiments, performance of the method 600 is continuous and ongoing for so long as the wearable physical activity tracking device 200 is worn and active (e.g., until the wearable physical activity tracking device 200 is removed by the wearer, deactivated by the wearer, etc.).

In some embodiments, by providing feedback on lifting behavior, the wearable physical activity tracking device 200 decreases the risk of injury and improves workplace safety. In some embodiments, by tailoring the providing of tangible alerts as a result of lifts to the current job role being performed by the wearer of the wearable physical activity tracking device 200, alerts are provided in a manner that is most suitable and useful to the wearer's current activity. As a result, the likelihood is increased that the wearer is provided with alerts at suitable levels of sensitivity and frequency. In some embodiments, by updating the wearer's job role on a dynamic basis, the wearable physical activity tracking device 200 provides a technical improvement to solutions that tailor alerts to the wearer's job role but only allow the job role to be set manually and do not account for changes to the wearer's responsibilities.

While a number of embodiments of the present invention have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

What is claimed is:

1. A system, comprising:
a wearable physical activity tracking device,
wherein the wearable physical activity tracking device is configured:
(1) to be worn by a user,
(2) to record a user-specific activity tracking data for the user and a user-specific location data while the user performs at least one activity role of a plurality of activity roles in at least one physical location of a plurality of physical locations, and
(3) to provide tangible feedback to the user, when the providing tangible feedback is based at least on
(a) the user-specific activity tracking data, and
(b) at least one alerting parameter corresponding to a current activity role of the plurality of activity roles performed by the user; and
a computing device, comprising:
a non-transient computer memory, storing software instructions; and
at least one processor,
wherein, when the at least one processor executes the software instructions,
the at least one processor is programmed to:
receive, for the user, at least:
the user-specific activity tracking data and
a user-specific location data for the user;
determine, based at least on the user-specific location data, at least one candidate activity role of the plurality of activity roles;
determine, based at least on the user-specific activity tracking data and the user-specific location data, a most likely one of the at least one candidate activity role;
select the most likely one of the at least one candidate activity role as the current activity role; and
provide, to the wearable physical activity tracking device, the at least one alerting parameter corresponding to the current activity role.

2. The system of claim 1, further comprising:
a plurality of location beacons,
wherein the user-specific location data is determined based at least on proximity of the wearable physical activity tracking device to the plurality of location beacons.

3. The system of claim 2, wherein the user-specific location data is determined by received signal strength indicator distance estimation.

4. The system of claim 2, wherein the user-specific location data is determined by the computing device based at least on the proximity of the wearable physical activity tracking device to the plurality of location beacons.

5. The system of claim 2, wherein the user-specific location data is received by the computing device from one of the location beacons.

6. The system of claim 2,
wherein the user-specific location data is determined by the wearable physical activity tracking device based on the based at least on the proximity of the wearable physical activity tracking device to the plurality of location beacons, and
wherein the user-specific location data is received by the computing device from the wearable physical activity tracking device.

7. The system of claim 1,
wherein the user-specific location data is determined by the wearable physical activity tracking device, and
wherein the user-specific location data is received by the computing device from the wearable physical activity tracking device.

8. The system of claim 1,
wherein, when the at least one processor executes the software instructions, the at least one processor is further programmed to:
determine a user-specific risk factor value for each of a plurality of risk factors based on the user-specific activity tracking data, and
wherein the step of determining the most likely one of the at least one candidate activity role is further based on the at least one user-specific risk factor value corresponding to at least one of the plurality of risk factors.

9. The system of claim 8, wherein the at least one candidate activity includes at least two candidate activities, and wherein the at least one of the plurality of risk factors is selected based on the at least two candidate activities.

10. The system of claim 9, wherein the at least one of the plurality of risk factors is selected as the at least one of the plurality of risk factors that distinguishes the at least two candidate activities.

11. The system of claim 8, wherein the step of determining the most likely one of the at least one candidate activity role is based at least on a weighted average of at least two user-specific risk factor values.

12. The system of claim 11, wherein the step of determining the most likely one of the at least one candidate activity role is based at least on a weighted average of (1) the at least two user-specific risk factor values and (2) a correlation between the user-specific location data and at least one location, wherein each of the at least one location corresponds to a particular one of the at least one candidate activity.

13. The system of claim 12, wherein the weighted average includes a first predetermined weight assigned to the at least two user-specific risk factor values and a second predetermined weight assigned to the correlation between the user-specific location data and the at least one location.

14. The system of claim 8, wherein the step of determining the most likely one of the at least one candidate activity role comprises:
receiving a first candidate activity risk factor value corresponding to (1) a first one of the at least one candidate activity role and (2) a first one of the plurality of risk factors;
receiving a second candidate activity risk factor value corresponding to (1) a second one of the at least one candidate activity role and (2) the first one of the plurality of risk factors; and
determining the most likely one of the at least one candidate activity role based at least on similarity of the user-specific risk factor value for the first one of the plurality of risk factors to (1) the first candidate activity risk factor value and (2) the second candidate activity risk factor value.

15. The system of claim 8, wherein the plurality of risks factors includes at least two of a lift rate, a maximum sagittal bend angle, a maximum tilt velocity, an average twist velocity, an average sagittal bend angle, an average pitch angle, a length of bend time, an unsafe bend count, or a safety score.

16. The system of claim 1, wherein the step of determining, based at least on the user-specific location data, the at least one candidate activity role of the plurality of activity roles comprises determining a location-based likelihood of each of the at least one candidate activity role.

17. The system of claim 16, wherein the step of determining the most likely one of the at least one candidate activity role is further based on the location-based likelihood of each of the at least one candidate activity role.

18. The system of claim 1, wherein the step of determining, based at least on the user-specific location data, at least one candidate activity role of the plurality of activity roles is performed based on averaged user-specific location data over a moving time window.

19. The system of claim 1, wherein the at least one alerting parameter includes at least one of a threshold sagittal angle, a bend number, a feedback window, and a feedback gap.

20. A computer-implemented method, comprising:
receiving, by a processor, at least user-specific activity tracking data for a user and user-specific location data for the user,
wherein the user-specific activity tracking data is received from a wearable physical activity tracking device worn by the user and recorded while the user performs at least one activity role of a plurality of activity roles in at least one physical location of a plurality of physical locations;
determining, by the processor, based at least on the user-specific location data, at least one candidate activity role of the plurality of activity roles;
determining, by the processor, based at least on the user-specific activity tracking data and the user-specific location data, a most likely one of the at least one candidate activity role;
selecting, by the processor the most likely one of the at least one candidate activity role as a current activity role; and
providing, by the processor, to the wearable physical activity tracking device, at least one alerting parameter corresponding to the current activity role.

\* \* \* \* \*